(12) United States Patent
Hanqvist et al.

(10) Patent No.: US 12,518,532 B2
(45) Date of Patent: Jan. 6, 2026

(54) APPARATUS, METHOD AND COMPUTER PROGRAM FOR TRACKING, CAPTURING AND OBSERVING SPORTS-RELATED EVENTS

(71) Applicant: PlayReplay AB, Stockholm (SE)

(72) Inventors: Mattias Hanqvist, Stockholm (SE); Hans Lundstam, Bromma (SE)

(73) Assignee: PlayReplay AB, Stockholm (SE)

( * ) Notice: Subject to any disclaimer, the term of this patent is extended or adjusted under 35 U.S.C. 154(b) by 0 days.

(21) Appl. No.: 18/555,512

(22) PCT Filed: Apr. 13, 2022

(86) PCT No.: PCT/SE2022/050367
§ 371 (c)(1),
(2) Date: Oct. 13, 2023

(87) PCT Pub. No.: WO2022/220730
PCT Pub. Date: Oct. 20, 2022

(65) Prior Publication Data
US 2024/0193949 A1    Jun. 13, 2024

(30) Foreign Application Priority Data
Apr. 14, 2021   (SE) .................................. 2150461-8

(51) Int. Cl.
*G06V 20/40* (2022.01)
*A63B 24/00* (2006.01)
(Continued)

(52) U.S. Cl.
CPC .......... *G06V 20/42* (2022.01); *A63B 24/0006* (2013.01); *A63B 71/0605* (2013.01);
(Continued)

(58) Field of Classification Search
CPC ........ G06V 20/42; G06V 10/25; G06V 10/12; G06V 10/62; G06V 10/764; G06V 20/52;
(Continued)

(56) References Cited

U.S. PATENT DOCUMENTS 10,143,907 B2 * 12/2018 Gentil .............. H04N 21/21805
12,134,013 B2 * 11/2024 Legg ..................... G05D 1/661
(Continued)

FOREIGN PATENT DOCUMENTS

AU    2018101018 A4    8/2018
EP    0345982 A1    12/1989
(Continued)

OTHER PUBLICATIONS

International Search Report and Written Opinion from related International Patent Application PCT/SE2022/050367 issued Jun. 8, 2022, 16 pages.
(Continued)

*Primary Examiner* — Helen Shibru
(74) *Attorney, Agent, or Firm* — Pillsbury Winthrop Shaw Pittman, LLP

(57) ABSTRACT

The present invention relates to an apparatus, method and computer program for collecting and processing digital information by computer vision and/or tracking as well as observing specific events during sports, in particular during the practice of racket sports, comprising: at least one camera pair for obtaining real image-related information in sports-related stereo, processor for processing the actual image-related information from the at least one camera, memory space containing stored comparison data for typical actions of a fictitious athlete and for typical movements and positions of a fictitious ball, the camera, processor and memory space all to each other for both storage and retrieval of digital information, the processor comparing the actual
(Continued)

image-related information from the at least one camera with the corresponding stored comparison data from the memory space and categorizing the work image-related information.

23 Claims, 5 Drawing Sheets

(51) Int. Cl.
*A63B 71/06* (2006.01)
*G06V 10/25* (2022.01)

(52) U.S. Cl.
CPC ...... *G06V 10/25* (2022.01); *A63B 2024/0015* (2013.01); *A63B 2071/0611* (2013.01); *A63B 2220/806* (2013.01); *A63B 2225/50* (2013.01)

(58) Field of Classification Search
CPC ........ G06V 10/40; G06V 40/23; G06V 10/94; A63B 24/0006; A63B 71/0605; A63B 2024/0015; A63B 2071/0611; A63B 2220/806; A63B 2225/50; A63B 67/045; A63B 2024/0034; A63B 2071/0613; A63B 2102/02; A63B 2102/04; A63B 2102/08; A63B 2102/16; A63B 61/003; A63B 61/02; A63B 2024/0012
See application file for complete search history.

(56) References Cited

U.S. PATENT DOCUMENTS

| | | | |
|---|---|---|---|
| 12,175,754 B2 * | 12/2024 | Ganguly | G06F 18/2413 |
| 12,223,017 B2 * | 2/2025 | Okur | G06F 18/251 |
| 2009/0067670 A1 | 3/2009 | Johnson et al. | |
| 2014/0376876 A1 | 12/2014 | Bentley et al. | |
| 2016/0328839 A1 | 11/2016 | Aoki et al. | |
| 2018/0154232 A1 | 6/2018 | Gentil | |
| 2018/0345116 A1 | 12/2018 | Watanabe et al. | |
| 2020/0398110 A1 | 12/2020 | Kosowsky et al. | |
| 2023/0381585 A1 * | 11/2023 | Wang | G06V 40/103 |
| 2024/0350890 A1 * | 10/2024 | Wei | A63B 71/0616 |
| 2025/0029514 A1 * | 1/2025 | Ramanathan | G09B 19/0053 |
| 2025/0041702 A1 * | 2/2025 | Hobden | A63B 71/0669 |

FOREIGN PATENT DOCUMENTS

| | | |
|---|---|---|
| JP | 2019124863 A | 7/2019 |
| KR | 102231202 B1 | 3/2021 |
| WO | 03104838 A1 | 12/2003 |
| WO | 2019244153 A1 | 12/2019 |

OTHER PUBLICATIONS

Office Action from related Swedish Patent Application issued Nov. 29, 2021, 10 pages.
Office Action from related Swedish Patent Application issued Mar. 22, 2023, 6 pages.
International Preliminary Report on Patentability for related International Patent Application PCT/SE2022/050367, issued Oct. 12, 2023, 9 pages.
European Search Report for related European Patent Application 22788545.6 issued on Jan. 23, 2025, 9 pages.
S. Messelodi, et al., "A Low-Cost Computer Vision System for Real-Time Tennis Analysis," in Image Analysis and Processing (ICIAP) 2019, Lecture Notes in Computer Science, Springer, XP047519882, vol. 11751, pp. 106-116, [retrieved on Sep. 2, 2019]. Retrieved from the Internet :<URL: https://link.springer.com/chapter/10.1007/978-3-030-30642-7_10#Abs1><DOI: 10.1007/978-3-030-30642-7_10>.
"Playsight Smart Courts," Courtsense.com, [retrieved on Jul. 15, 2025], [online]. Retrieved from Internet: <URL: https://www.courtsense.com/smart-tennis-courts/>.
YouTube video entitled "The PlaySight SmartCourt for Tennis,", uploaded on Jun. 26, 2017, by user "PlaySight Interactive" [retrieved on Jul. 15, 2025], [online]. Retrieved from Internet: <URL: https://www.youtube.com/watch?v=M1eNjNvVoGM&t=25s>.
Vance, Ashlee, "This $200 AI Will End Tennis Club Screaming Matches," Bloomberg, Mar. 2, 2017, 2 pages, [retrieved on Jul. 15, 2025], [online]. Retrieved from Internet: <URL: https://www.bloomberg.com/news/articles/2017-03-02/this-200-ai-will-end-tennis-club-screaming-matches>.
"Hardware," In/Out, 2017-2025, 14 pages, [retrieved on Jul. 15, 2025], [online]. Retrieved from Internet: <URL: https://support.inout.tennis/hardware>.
SwingVision, Inc., "SwingVision: Tennis Pickleball," Version 11.9.25, Mac App Store Preview, [retrieved on Jul. 15, 2025], [online]. Retrieved from Internet: <URL: https://apps.apple.com/us/app/swingvision-tennis-pickleball/id989461317?utm_source=chatgpt.com>.
Swing.Vision, [retrieved on Jul. 15, 2025], [online]. Retrieved from Internet: <URL: https://swing.vision/>.
YouTube video entitled "Wingfield | How It Works", uploaded on Mar. 14, 2021, by user "Wingfield" [retrieved on Jul. 15, 2025], [online]. Retrieved from Internet: <URL: https://www.youtube.com/watch?v=ZCcQWtRPpts>.
"2.2 Tennis: Connect the Wingfield Box to the Internet," Installation Guide Wingfield Box (Tennis), 12 pages, [retrieved on Jul. 15, 2025], [online]. Retrieved from Internet: <URL: https://help.wingfield.io/en/wingfield-box-online>.

* cited by examiner

APPARATUS, METHOD AND COMPUTER PROGRAM FOR TRACKING, CAPTURING AND OBSERVING SPORTS-RELATED EVENTS

CROSS-REFERENCE TO RELATED APPLICATIONS

This present patent is a U.S. National Phase under 35 U.S.C. Section 371 of International Patent Application PCT/SE2022/050367, titled APPARATUS, METHOD AND COMPUTER PROGRAM FOR TRACKING, CAPTURING AND OBSERVING SPORTS-RELATED EVENTS, filed 13 Apr. 2022, which claims the benefit of priority to Swedish Patent Application SE2150461-8, filed 14 Apr. 2021. The entire content of each aforementioned patent filing is hereby incorporated by reference.

TECHNICAL FIELD

The present invention relates to the field of tracking, capturing and observing sports-related actions and events based on computer vision and machine learning. In particular, the invention relates to an apparatus, a method and a computer program for using relatively small and simple cameras at a relatively low cost, for determining the position of the court/table, player, racket as well as positioning the ball with high accuracy. Above all, the intended application for the equipment is in various racquet sports (such as tennis, table tennis, badminton, padel and squash).

BACKGROUND

There are currently only a few vendors on the market that provide various computer vision and tracking systems with particular application in racquet sports. Especially for tennis, which despite fierce competition from several other racquet sports, can probably be considered the largest and geographically most evenly distributed of the racquet sports, there are some prior art tracking and computer vision systems that all work in different ways and with their respective strengths and weaknesses. A common denominator for these well-known systems with brands such as Hawk-Eye, Playsight and Foxtenn is that they require a number of cameras, which are either to be mounted high and directed downward, or are to be mounted low and directed obliquely upward, for example placed under the net and with transparent glass sections levelled with the floor/ground level. Common to the various camera mounts is that they all have and require advanced and high-resolution precision optics. Also in other respects, these systems are relatively complicated and expensive to install, maintain and use. At present, it is thus mostly larger and resourceful international tournaments with professional tennis players that can afford and have the opportunity to use such systems, and without generous sponsors, this assistance for players, referees, spectators and TV viewers would no longer be possible.

There are also a number of other systems, which are considerably less costly than the previously mentioned, and which do not need to be mounted high above the floor on, for example, a tennis court, but can be placed at a more suitable and practical height, such as on about one meter's height above the floor level. These systems are known by brands such as Baseline Vision, Wingfield and Zennis. The latter system, however, differs somewhat from the previous ones by having sensors mounted at a certain height above the track. However, these systems, as well as the more complex and costly systems, are all associated with various problems and weaknesses. As an example of the above can be mentioned that the optical equipment and required components are too space-consuming or need to be mounted in such a way that during normal operation they interfere with the game or do not meet applicable requirements and regulations within the respective racket sports in order to function satisfactorily.

With particular reference to the above drawbacks of prior art systems, an example can be found in the published international patent application WO 2019/244153 A1. This application describes a device, system and method for computer vision, object tracking and image analysis, in particular intended for analysis of images or video sequences of tennis. The system includes two adjacent and co-located cameras, oriented at an angle of 20°-120° to each other, which have a combined field of view that covers most of a tennis court. A processor analyses information obtained from the cameras using computer vision algorithms.

There are a few more systems, which, however, show a precision that is too deficient to be acceptable and work in practice. These systems are simply not advanced enough to be able to collect qualitative information with which one can, with satisfactory probability, assess whether a ball is to be judged as right or wrong (in or out), i.e. bounce on or off a certain line, or even be able to collect statistical information about a player's specific game patterns or actions.

No previously known system has succeeded in solving the problem of providing a technical solution that is robust and functional, and offers satisfactory precision and reliability, to conditions attractive to the mass market, and which at the same time can be easily, smoothly and safely mounted in a manner consistent with current regulations for the various racquet sports.

SUMMARY OF THE INVENTION

The above-mentioned problems, with which previously known systems are associated, are solved by the present invention by an apparatus according to the independent claim 1. In addition, a method and a computer program according to the invention are provided to solve related problems and make significant contributions.

Further technical effects of the invention appear from the dependent claims 2-14.

The core of the technical solution according to the invention is based on the use of small and easily accessible low-cost components for advanced tracking of sports-related actions and events (so-called sports tracking). This is done by controlling a camera sensor's image capturing properties (gain, framerate, exposure time, cropping, resolution, etc.), in a way that has not been done before in the field of racket sports. Racket sports offer limited space and limited possibilities for setting up camera tracking or tracing, which distinguishes the area from many other possible applications or from other solutions presented in related technical areas.

By using small components, the equipment can be placed in a way that does not interfere with the game. This is done, for example, by placing the camera equipment in a way that makes the equipment an integral part of the net post/pole. By integrated is meant here that the equipment is functional and from a regular perspective is to be regarded as part of the net post/pole. This further means that its components and connections between the components are built into a thin, slender casing, which in turn is attached to at least one, but most likely in both net posts/poles. If possible, it is also conceivable that the equipment is built into the net post/pole, which applies to all racket sports, but perhaps especially for table tennis applications, so that the cover and the net post/pole are in one piece, i.e. housing and net post/pole are designed to be fully integrated with each other. Because the casing, as well as by extension the entire installation including components and other equipment, is so thin, the equipment does not interfere with the game in the sense that it intrudes on the track, or is otherwise incompatible with racket sports regulations or disturbs participants in practice. In accordance with an alternative embodiment, the equipment is designed as part of or an integral part of the referee's chair instead of as part of or in connection with the net post/pole. As the referee's chair in many cases, for example in tennis, is slightly raised in relation to the net post/pole, this can be an excellent alternative or complement to the net post/pole for mounting equipment according to the invention.

By using low-cost components, a high-performance user experience, often equivalent to the high precision achieved using the previously described and more advanced so-called tracking, can be provided at a significantly lower cost than existing solutions allow. The availability of components can also be expected to be relatively good and easy to secure for manufacturers of the device according to the invention. This is especially true compared to specialized high-cost components, such as more advanced printed circuit boards, microchips and processors, which are normally manufactured in smaller series and which are intended for specific applications where manufacturers in most cases must plan well to make orders well in advance.

Preliminary tests performed by the applicant indicate that the end user's experience of the present invention is excellent. The measured precision on tennis courts is significantly better than the human-assessed precision, and the average error in the assessments is only a few millimetres. As the distance between the optical equipment in, for example, a net post/pole and an impact area in racquet sports other than tennis is shorter, even better precision is expected to be achieved in the other racquet sports, such as padel, badminton, table tennis and squash.

By using low-cost components, the product can also be provided, not only at a lower price but also with a different business model than the one hitherto dominated in the market for systems with high performance, precision and reliability. As an example, systems with comparable precision (e.g. Hawk-Eye) utilise components at a significantly higher cost. A system like the above-mentioned is therefore typically offered at a cost of about 50 000 EUR per installation. By comparison, the apparatus according to the present invention can be provided, either entirely or at least essentially, free of installation costs, and require a license fee to be paid by customers of only a few tens of EUR per month for the individual end user.

This completely removes the entry barrier for sports and racket halls to be able to offer their customers, i.e. typically exercisers and other racket players as well as other stakeholders a significantly enhanced experience. The enhanced experience is achieved by providing the playing field or venue with a relatively advanced equipment for tracking and observing sports-related events at a virtually non-existent entry cost, whereby the need for significant amounts of restricted capital or utilisation of venture capital becomes significantly less, if not non-existent, compared to previously known systems.

DESCRIPTION OF EMBODIMENTS

For a description of various alternatives, examples and embodiments of the present invention, reference is made to the accompanying drawings.

Figure 1:
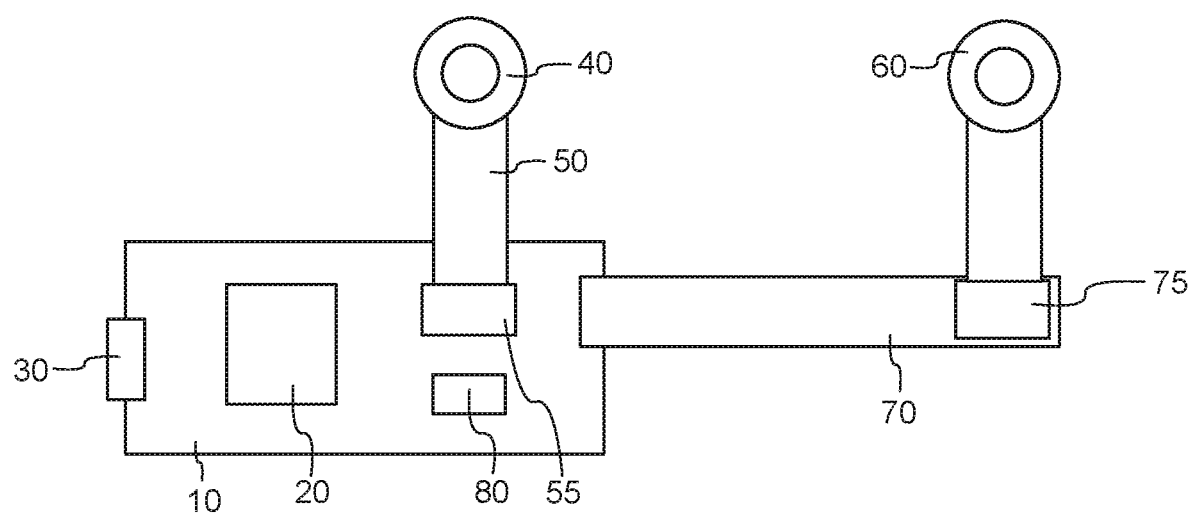
FIG. 1 schematically shows different components that are included in the device and how they are connected to each other.

FIG. 1 is a schematic sketch of the various components included in the device and how they are connected to each other. A printed circuit board (PCB) is located centrally in the device, and is typically rectangular in shape with the sides 65 mm×20 mm as dimensions. According to this particular embodiment, the mentioned dimensions are maximum dimensions, but for alternative embodiments, in particular with larger inner space, the dimensions may of course be altered in either directions. Mounted on this printed circuit board is a chip with a processor 20, from which a plurality of functions are controlled and controlled, such as camera control, data processing and synchronization of input and cooperating components. A USB connector 30 is provided at the main printed circuit board for connection to a power source, which power source can be both a mains connection and battery operation. Furthermore, one at least one camera module 40 is connected to the main printed circuit board, either directly or via a so-called flex-PCB connection 50, preferably including a first connector 55 for contacting the camera module or another sensor module.

According to an alternative embodiment of the device according to the present invention, a further camera module 60 is connected to the main printed circuit board. This too is then connected to the main printed circuit board via an additional flex-PCB connection 70 by means of a second connector 75 for different types of sensor modules. However, this second camera module is located at a distance from the main circuit board, so direct contact is not possible. The distance between the camera modules is preferably between 30 mm to a maximum of approximately 70 mm. The upper limit is due to practical limitations of separating the camera modules within the same installation, without the installation becoming awkward or too bulky, and thus incompatible with other dimensional limitations. Such limitations may for instance be applicable regulations in the context of competition for a particular racquet sport or other limiting or influencing factors to take into account. Needless to say, the mentioned distance may be varied both upwards and downwards, depending on the construction and space available, but also in dependence of other relevant restrictions.

As mentioned, the main circuit board can be used with both one and two camera modules. In addition, two camera modules from different main circuit boards can work together, which is made possible by synchronizing the various components. According to this embodiment, there is also a pin 80 (pin for camera sync) provided for the purpose on the main circuit board for clocking different units, i.e. synchronize different input devices in time, such as in the current case the two input camera modules. This allows the camera modules to be placed at longer distances from each other, whereby synchronization of the camera modules and the data processing from them is still possible, either via network, power or other cables or wirelessly via Wi-Fi connections or any other applicable communication protocol. A typical installation with cooperating camera modules which belong to different main printed circuit boards is in installations of equipment according to the invention in net posts/poles on both sides of the net, for example on a tennis court. Another advantage of having synchronized and cooperating camera modules at a relatively large distance from each other is that the precision can be improved by large triangulation angles, and that the combined field of view of the two camera modules becomes significantly larger than the corresponding field of view from two closer cameras, for example controlled from the same circuit board. It should also be mentioned in this context that synchronization of different camera modules with respect to time is not necessary for the equipment according to the invention to function. However, the synchronization can have an important functional significance for the invention, as the precision and thus the reliability of the equipment can be further improved by controlling the camera modules to cooperate in a time-synchronized manner.

According to yet another alternative embodiment of the invention, it is possible, as an alternative to one or two camera pairs operating in stereo, instead to connect four or more single cameras operating individually. In other words, utilization of mono units instead of stereo units would be both feasible and advantageous, whereby system flexibility can be even further enhanced.

Figure 2:
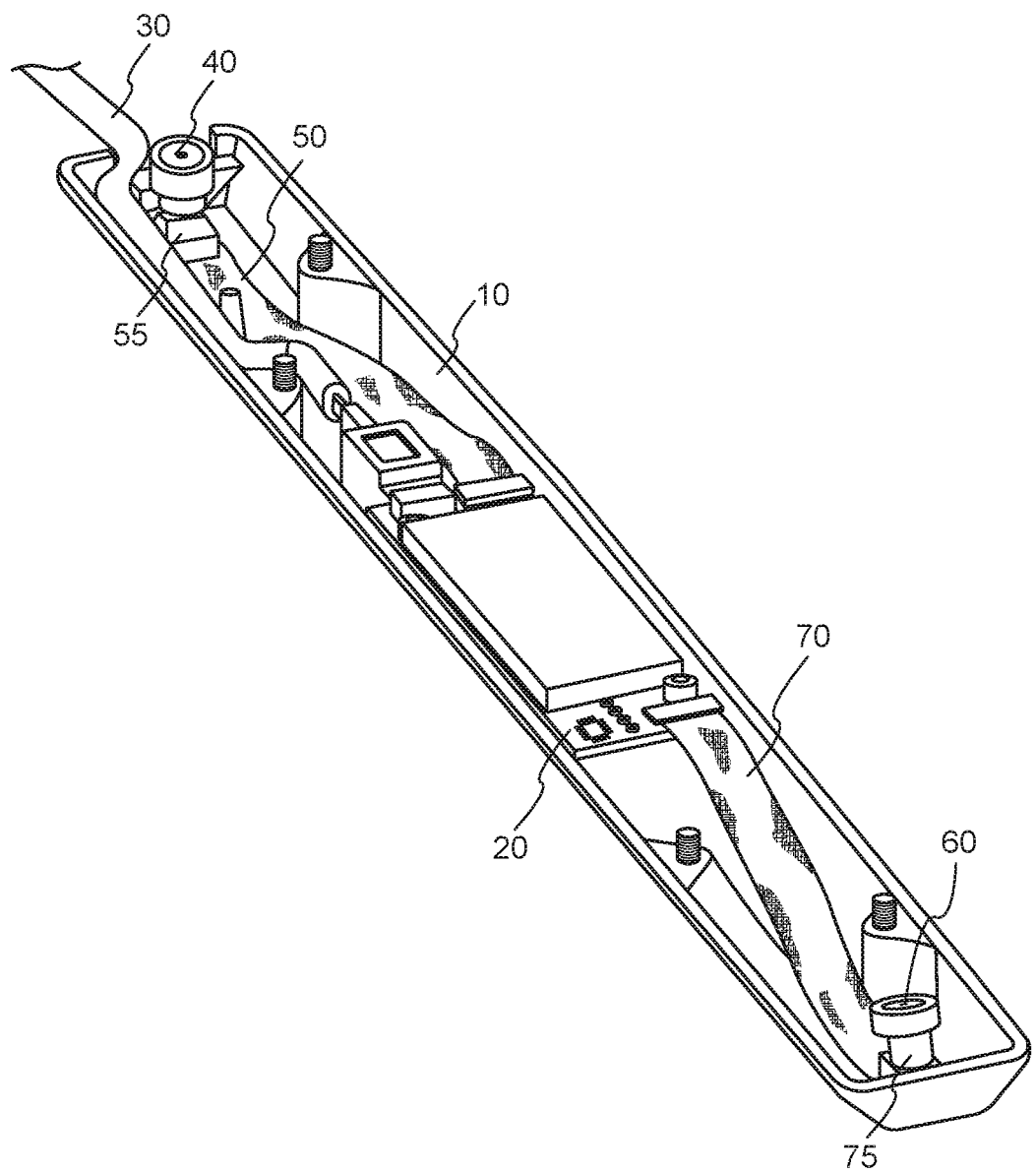
FIG. 2 shows the device in the open condition with special focus on how the housing is shaped and how the bottom and lid parts of the housing are attached, preferably screwed together.
Figure 3:
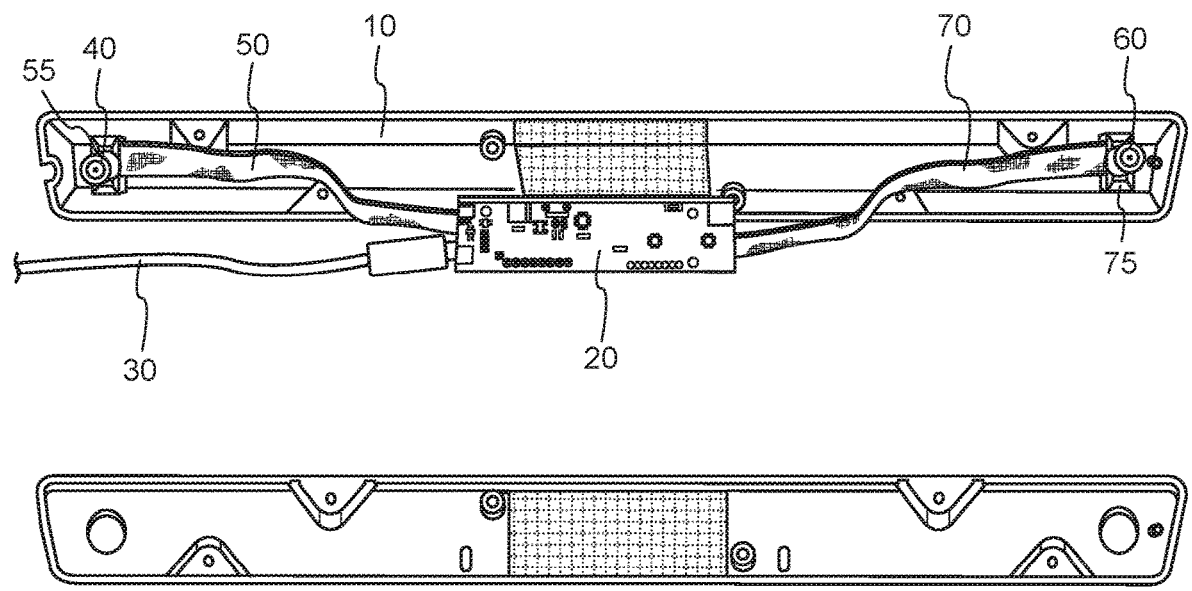
FIG. 3 shows the bottom and lid of the device, illustrating the main printed circuit board and processor together with the data and network connection.
Figure 4:
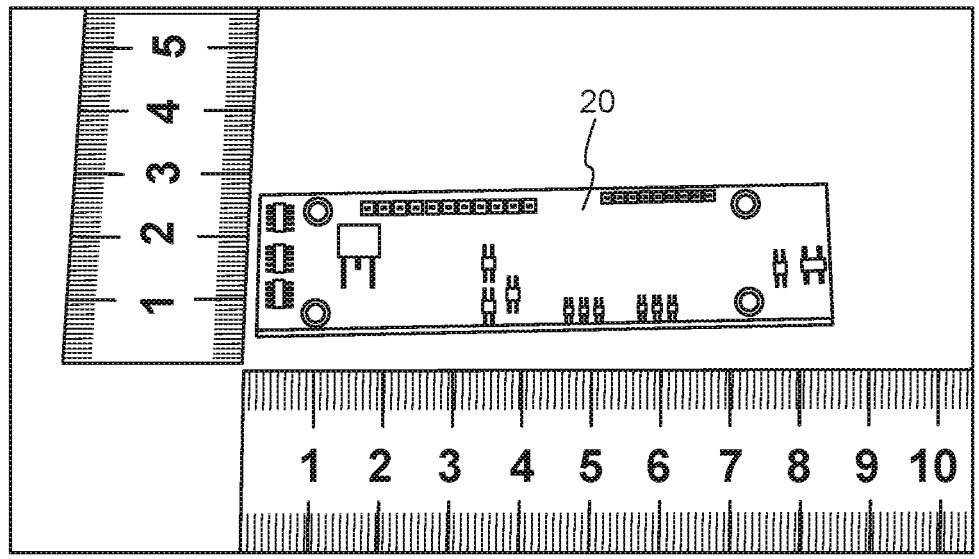
FIGS. 4 and 5 show the design, technical construction and dimensions of the main printed circuit board in top and bottom views, respectively.
Figure 5:
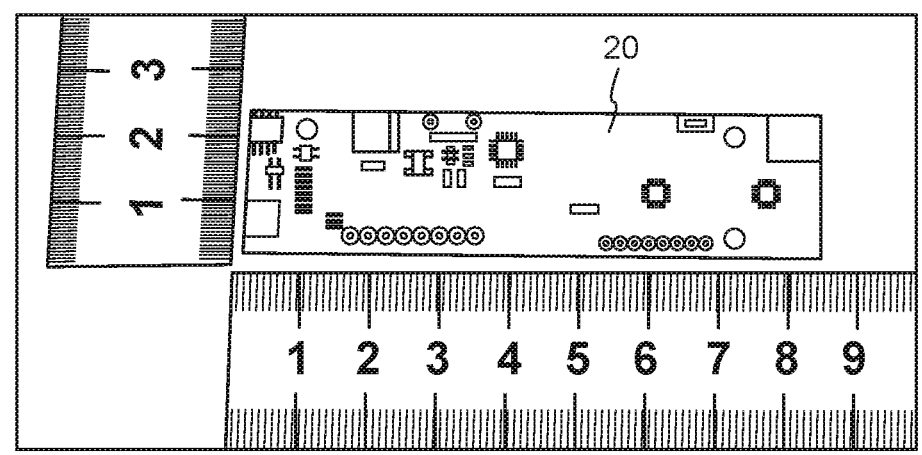
Figure 6:
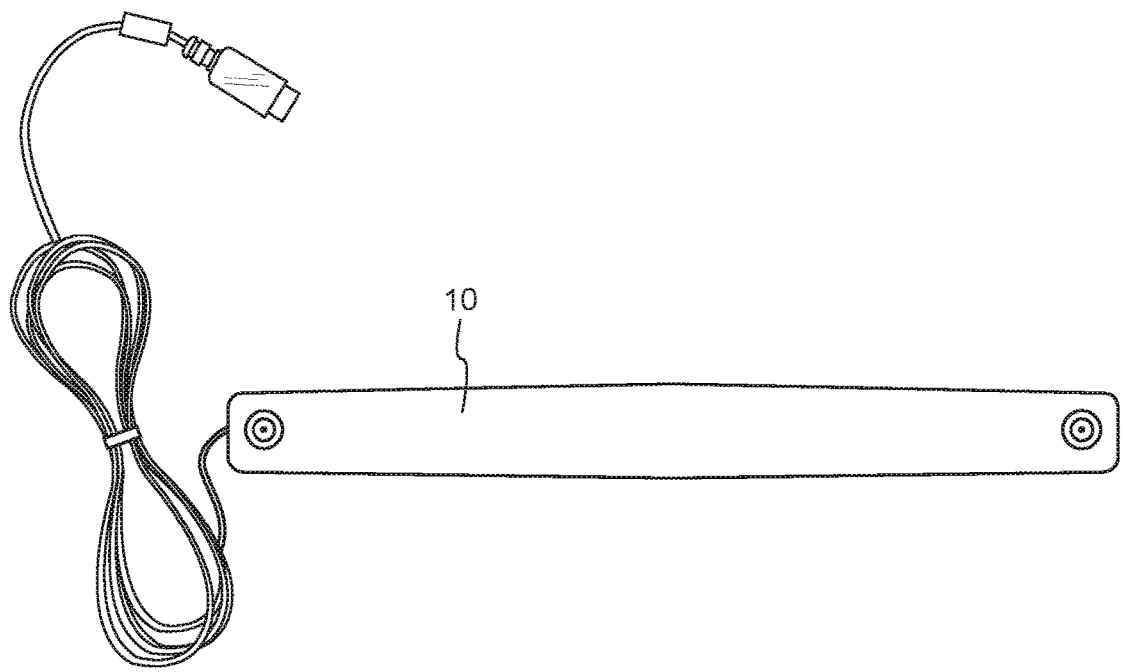
FIGS. 6 and 7 show the design, technical construction and dimensions of the housing in top and bottom views, respectively.
Figure 7:
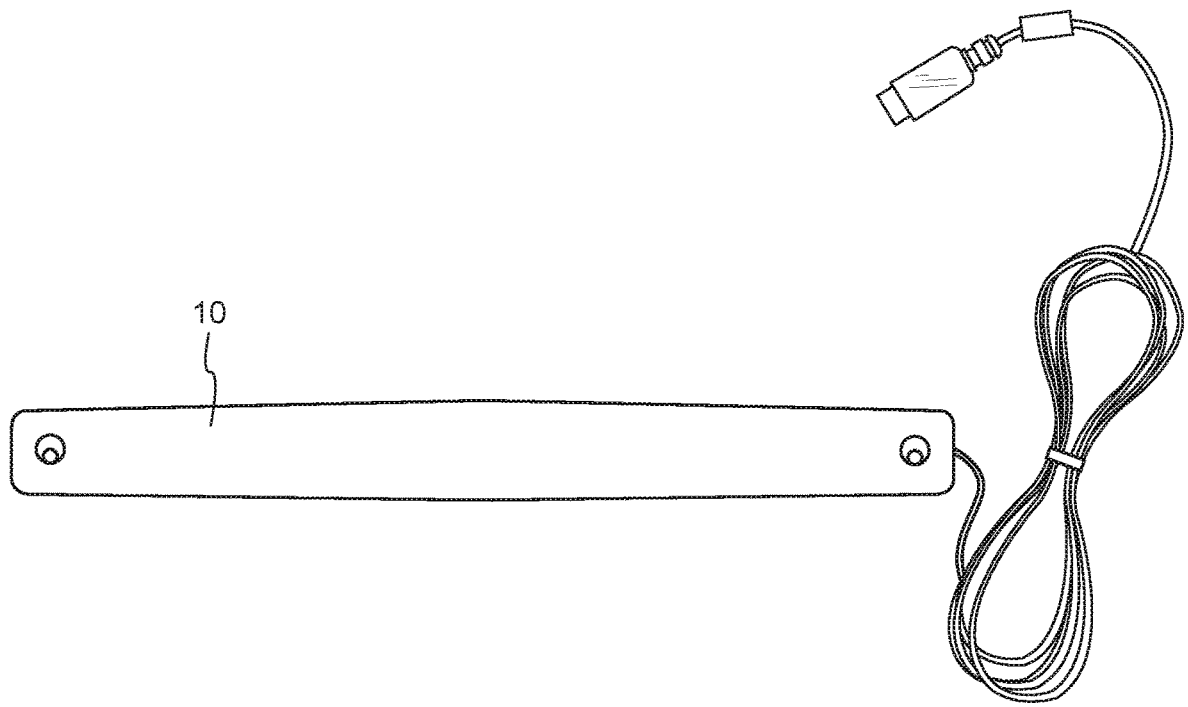

FIG. 2 shows the device in the open condition with special focus on how the housing is shaped and how the bottom and lid of the housing are attached, preferably screwed together. According to a preferred embodiment, the housing is a camera sensor cover, which is designed as a hard shell in impact-resistant material, for example hard plastic, composite material or metal. This is to protect against impacts, such as a direct ball hit, without adversely affecting the image quality, such as by at least partially obscuring the image, preventing sufficient light entry or otherwise interrupting the light path or otherwise obstructing optimal image capture.

In addition to what has been mentioned previously, it is also possible to activate and control the device by voice control to, for example, only receive support from the invention to determine whether a ball bounced on or off a line in doubtful cases.

The dimensions in the drawings are stated to suit tennis and the dimensions that a regulated net post/pole in tennis must comply with. The dimensions are intended to be adapted to the dimensions and designs that other applicable racket sports allow. The drawings are thus to be regarded as schematic and intended to be adapted to each specific racket sport, including its specific equipment and rule collections, in which the device may be used.

Stored comparison data with which acquired information is intended to be compared with may consist of information and associated logic that interprets and classifies an object's appearance and movement pattern.

According to the present invention, the imaging properties of the camera sensor can be varied in different ways. An example previously mentioned is cropping, where an algorithm is used to select a smaller area of the camera sensor based on image information, which is analysed in detail by image processing while the rest of the camera sensor field is left completely without analysis or with only a more rudimentary analysis.

The resolution of the camera sensor can also be varied, whereby the same algorithm as above or a similar algorithm is used to treat a certain part of the area of the camera sensor in high resolution while another area is treated in lower resolution.

In both of the above cases, i.e. cropping and resolution, the purpose is to treat the most interesting and informative parts of the camera sensor area at high speed, while other areas are prioritized down. In this way, a good quality and precision can be achieved and maintained over time, even though the components used according to the invention can show significantly lower performance and price than other system components, which could be alternatives for creating comparable results in terms of precision and speed, but as previously discussed, must be excluded for purely practical reasons.

To further clarify what is meant by compliance with the rule, the term "compliant" means that with a typical net post/pole including equipment/cover according to the invention is still within the rules for what is the maximum permitted size for a tennis post (according to national and international tennis rules).

Functional compliance means that by being "compliant", the net post/pole, even with equipment/casing, still achieves the same functional purpose (with regard to the net post's/pole's function in the game, the net post's/pole's location on the court, and the possibility to adjust the tension of the net and finally to mount/dismount the net post/pole and the net).

The invention claimed is:

1. An apparatus for collecting and processing digital information captured by means of computer vision and/or tracking, for the purpose of observing events during the practice of sport, in particular during the practice of racket sports, comprising:
    at least one pair of camera sensors for capturing actual image-related information in stereo related to a sport,
    a processor for processing the actual image-related information from the at least one pair of camera sensors,
    memory space containing stored comparison data for actions of a fictitious athlete and for movements and positions of a fictitious ball,
    wherein the camera sensors, the processor, and the memory space are all connected to each other for both storage and retrieval of digital information, and
    wherein the processor is configured to perform operations comprising comparing the actual image-related information from the at least one pair of camera sensors with the corresponding stored comparison data from the memory space and categorizing the actual image-related information, and
    circuitry and/or code configured to observe and interpret categorized information itself or to transmit image-based information for external interpretation.

2. The apparatus according to claim 1, wherein the at least one pair of camera sensors is synchronized at the pixel level.

3. The apparatus according to claim 1, wherein the processor utilizes image processing and data processing for tracking, computer vision, and machine learning in the acquisition, processing, comparison, and categorization of digital information.

4. The apparatus according to claim 1, wherein the processor is configured to select a certain section of an entire imaged area of the camera sensor as a priority area, based on similarity of the corresponding stored comparison data, and then process this area at a higher speed than surrounding areas.

5. The apparatus according to claim 1, wherein the processor is configured to select a particular section of an entire imaged area of the camera sensor as a priority area, based on similarity of the corresponding stored comparison data, and then process this area with higher resolution than surrounding areas.

6. The apparatus according to claim 1, wherein the at least one pair of camera sensors are adapted to retrieve information related to determining and timing at least one of the following: track or table position, player, racket and ball position.

7. The apparatus according to claim 1, wherein the processor is further connected to a sound and/or light source configured to signal whether a point of impact of a ball is outside a path limit, and indicate the ball is out.

8. The apparatus according to claim 1, wherein the processor is further connected to a communication means, which is configured to transmits a digital signal containing information received by an application, in which observation and interpretation in a mobile telephone is done, in such a way that a user of the mobile telephone receives assistance to determine whether a certain ball bounced inside or outside a line, or get help with statistics about their own, their teammate's, their opponent's play and/or one about an arbitrary player.

9. The apparatus according to claim 1, wherein the at least one pair of camera sensors, the processor, and the memory space are all mounted in a housing configured to be placed adjacent to at least a first power pole or to a referee's chair, the at least one pair of camera sensors being aimed in such placement at obtaining real image-related information related to the sport on at least part of a game plan.

10. The apparatus according to claim 1, wherein the at least one pair of camera sensors, the processor, and the memory space are all mounted in a housing configured to be placed in or in proximity to a net post or pole, the at least one pair of camera sensors when so placed being directed to obtain real image-related information related to the practice of sports on at least part of a playing field, and wherein the actions of the fictitious athlete are normally occurring actions and the movements and positions of the fictitious ball are normally occurring.

11. The apparatus according to claim 10, wherein the housing is at the same time a camera sensor cover which is designed as a hard shell in impact-resistant material, for protection against impacts without adversely affecting image quality, by obscuring parts of the image.

12. The apparatus according to claim 10, wherein the housing is at least functionally integrated in the net post/pole or a referee's chair.

13. The apparatus according to claim 10, wherein the housing is formed in one piece with the net post/pole or a referee's chair.

14. The apparatus according to claim 10, wherein the housing is configured to occupy less than 50% of the total area of the net post/pole and housing.

15. The apparatus according to claim 9, wherein the housing is at the same time a camera sensor cover which is designed as a shell in impact-resistant material, for protection against impacts without adversely affecting image quality, by obscuring parts of the image.

16. The apparatus of claim 1, wherein:
the at least one pair of camera sensors comprises a first pair of camera sensors configured to be attached to a first net pole and a second pair of camera sensors configured to be attached to a second net pole, and wherein the first pair of camera sensors are configured to fit within dimensional bounds permitted for a tennis regulation-compliant net pole when attached to the first net pole.

17. The apparatus of claim 16, wherein:
the first pair of camera sensors and the second pair of camera sensors are configured to be attached on a first side of a net;
the at least one pair of camera sensors comprises a third pair of camera sensors configured to be attached to the first net pole and a fourth pair of camera sensors configured to be attached to the second net pole; and
the third pair of camera sensors and the fourth pair of camera sensors are configured to be attached on a second side of the net, opposite the first side.

18. The apparatus of claim 17, comprising a court with the first pair of camera sensors and the third pair of camera sensors integrated into the first net pole and the second pair of camera sensors and the fourth pair of camera sensors integrated into the second net pole.

19. A system, comprising:
a first housing configured to be mounted to a first net pole of a racket-sport court, the first housing having a size and shape configured to fit within dimensional bounds permitted for a tennis regulation-compliant net pole when mounted to, or integrated into, such a pole;
a first printed circuit board (PCB) inside the first housing, the first PCB being smaller than or equal to 65 millimeters (mm) tall by 20 mm wide;
a first processor mounted to the first PCB;
a first camera communicatively coupled to the first processor via the first PCB; and
a second camera communicatively coupled to the first processor via the first PCB, wherein the first camera and the second camera are between 30 mm and 70 mm apart from one another and at least partially inside the first housing, and wherein the first PCB includes a first set of signal paths for a first synchronization signal by which the first camera is synchronized with the second camera;
wherein the first processor is configured to effectuate operations by one or more computer-vision systems to:
detect a ball in a first set of synchronized images including images from both the first camera and the second camera;
crop or reduce resolution of portions of the first set of synchronized images not including the ball;
track movement of the ball; and
determine whether the ball bounced in-bounds or out-of-bounds on the racket-sport court.

20. The system of claim 19, comprising:
a second housing configured to be mounted to a second net pole of a racket-sport court;
a second printed circuit board (PCB) inside the second housing, the second PCB being smaller than or equal to 65 millimeters (mm) tall by 20 mm wide;
a second processor mounted to the second PCB;
a third camera communicatively coupled to the second processor via the second PCB; and
a fourth camera communicatively coupled to the second processor via the second PCB, wherein the third camera and the fourth camera are between 30 mm and 70 mm apart from one another and at least partially inside the second housing, and wherein the second PCB includes a second set of signal paths for a second synchronization signal by which the third camera is synchronized with the fourth camera;

wherein the second processor is configured to effectuate operations by one or more computer-vision systems to:

detect the ball in a second set of synchronized images including images from both the third camera and the fourth camera;

reduce resolution of portions of the second set of synchronized images not including the ball;

track movement of the ball; and determine whether the ball bounced in-bounds or out-of-bounds on the racket-sport court.

21. The system of claim 19, wherein the one or more computer-vision systems are executed at the racket-sport court.

22. The system of claim 19, comprising:

the racket-sport court, the court having a pair of net poles to which the first housing and a second housing are mounted.

23. A method comprising:

obtaining, with a processor, a first set of synchronized images including images from both a first camera and a second camera, the images depicting overlapping portions of a racket-sport court having a boundary line;

detecting, with the processor, a ball in the first set of synchronized images including images from both the first camera and the second camera;

cropping or reducing resolution of portions of the first set of synchronized images not including the ball with the processor;

tracking, with the processor, movement of the ball; and determining, with the processor, whether the ball bounced in-bounds or out-of-bounds on the racket-sport court relative to the boundary line, wherein the method is performed by a system having a size and shape configured to fit within dimensional bounds permitted for a tennis regulation-compliant net pole when mounted to, or integrated into, such a pole.

\* \* \* \* \*